(12) United States Patent
Pandharipande et al.

(10) Patent No.: US 9,596,549 B2
(45) Date of Patent: Mar. 14, 2017

(54) AUDIO SYSTEM AND METHOD OF OPERATION THEREFOR

(75) Inventors: Ashish Vijay Pandharipande, Eindhoven (NL); Sriram Srinivasan, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 788 days.

(21) Appl. No.: 13/996,347

(22) PCT Filed: Jan. 2, 2012

(86) PCT No.: PCT/IB2012/050007
§ 371 (c)(1),
(2), (4) Date: Jun. 20, 2013

(87) PCT Pub. No.: WO2012/093345
PCT Pub. Date: Jul. 12, 2012

(65) Prior Publication Data
US 2013/0272096 A1 Oct. 17, 2013

(30) Foreign Application Priority Data
Jan. 5, 2011 (EP) .................................. 11150153

(51) Int. Cl.
*H04R 25/00* (2006.01)
*G01S 7/521* (2006.01)
(Continued)

(52) U.S. Cl.
CPC ............ *H04R 25/405* (2013.01); *G01S 7/521* (2013.01); *G01S 15/06* (2013.01); *G01S 15/10* (2013.01);
(Continued)

(58) Field of Classification Search
CPC .......... G01S 15/06; G01S 15/10; G01S 7/521; G01V 1/001; G10K 11/348; H04R 2499/13; H04R 25/405; H04R 3/005; H04S 7/303
(Continued)

(56) References Cited

U.S. PATENT DOCUMENTS 4,586,195 A    4/1986  DeGeorge et al.
6,445,804 B1*  9/2002  Hirayanagi .............. H04R 3/00
                                              381/117
(Continued)

FOREIGN PATENT DOCUMENTS

CN    1979575 A      6/2007
CN    101277422 A    10/2008
(Continued)

OTHER PUBLICATIONS

Masamitsu Murase et al, "Multiple Moving Speaker Tracking by Microphone Array on Mobile Robot", Interspeech 2005, pp. 249-252, Sep. 4-8, Lisbon, Portugal.

*Primary Examiner* — Luke Ratcliffe
*Assistant Examiner* — Amienatta M Ndure Jobe

(57) ABSTRACT

An audio system that includes an ultrasound sensor array which has a plurality of ultrasound sensor elements, and an audio band array which has a plurality of audio band elements. An estimator is configured to generate a presence characteristic of a user in response to ultrasound signals received from the ultrasound sensor array. The presence characteristic may include a position estimate for the user. An audio array circuit is configured to generate a directional response for the audio band array by applying weights to individual audio band signals for the audio band elements. A weight circuit is configured to determine the weights in response to the presence characteristic.

22 Claims, 9 Drawing Sheets

(51) Int. Cl.
*G01S 15/06* (2006.01)
*G01S 15/10* (2006.01)
*G01V 1/00* (2006.01)
*G10K 11/34* (2006.01)
*H04R 3/00* (2006.01)
*H04S 7/00* (2006.01)

(52) U.S. Cl.
CPC ............ G01V 1/001 (2013.01); G10K 11/348 (2013.01); H04R 3/005 (2013.01); H04R 2499/13 (2013.01); H04S 7/303 (2013.01)

(58) Field of Classification Search
USPC ..... 381/86, 303, 92, 71.4, 119, 57, 71.7, 26, 381/300, 313, 317, 398, 71.1, 71.6, 80, 381/97, 107, 110, 152, 17, 301, 309, 315, 381/330, 337, 428, 56, 71.14, 91, 94.3; 367/11, 7, 87, 119, 12, 140, 180, 188, 97; 446/456, 454; 704/231, 205, 227, 233, 704/275; 181/148, 169, 290; 248/205.1; 252/182.14; 340/467; 342/357.51; 348/14.08, 14.16; 370/260; 700/94; 701/2; 705/14.63; 710/314; 73/589, 644
See application file for complete search history.

(56) References Cited

U.S. PATENT DOCUMENTS

| | | | |
|---|---|---|---|
| 6,457,346 B1* | 10/2002 | Kline-Schoder | A61B 8/08 128/916 |
| 7,941,480 B2* | 5/2011 | Atsmon | G01S 5/22 704/200.1 |
| 8,249,298 B2 | 8/2012 | Saleh et al. | |
| 9,060,683 B2* | 6/2015 | Tran | A61B 5/0022 |
| 9,219,708 B2* | 12/2015 | Anati | G06F 21/445 |
| 2005/0248233 A1* | 11/2005 | Pompei | G10K 15/02 310/322 |
| 2005/0273218 A1* | 12/2005 | Breed | B60C 11/24 701/2 |
| 2005/0276163 A1* | 12/2005 | Moon | G01S 15/102 367/92 |
| 2006/0165242 A1 | 7/2006 | Miki et al. | |
| 2007/0135984 A1* | 6/2007 | Breed | B60R 21/01516 701/45 |
| 2007/0161904 A1* | 7/2007 | Urbano | A61B 8/00 600/459 |
| 2007/0273504 A1* | 11/2007 | Tran | A61B 5/0022 340/539.12 |
| 2008/0001735 A1* | 1/2008 | Tran | G06F 19/3418 340/539.22 |
| 2008/0071532 A1 | 3/2008 | Ramakrishnan et al. | |
| 2008/0095401 A1* | 4/2008 | Saleh | G01S 3/808 382/103 |
| 2008/0110263 A1* | 5/2008 | Klessel | G01S 7/52028 73/602 |
| 2008/0112265 A1* | 5/2008 | Urbano | G01S 7/52096 367/87 |
| 2008/0114255 A1* | 5/2008 | Schwartz | A61B 8/00 600/474 |
| 2008/0188752 A1* | 8/2008 | Randall | A61B 8/06 600/455 |
| 2008/0300055 A1* | 12/2008 | Lutnick | G07F 17/3209 463/39 |
| 2009/0054784 A1 | 2/2009 | Okuda et al. | |
| 2009/0164212 A1 | 6/2009 | Chan et al. | |
| 2009/0285404 A1 | 11/2009 | Hsu et al. | |
| 2010/0110273 A1 | 5/2010 | Turbahn et al. | |
| 2010/0150360 A1 | 6/2010 | Beaucoup | |
| 2010/0204991 A1 | 8/2010 | Ramakrishnan et al. | |
| 2011/0077758 A1* | 3/2011 | Tran | A61B 5/002 700/94 |
| 2011/0121654 A1* | 5/2011 | Recker | H05B 37/0272 307/66 |
| 2011/0133655 A1* | 6/2011 | Recker | H02J 9/02 315/159 |
| 2013/0064042 A1* | 3/2013 | Aarts | G01S 15/89 367/99 |
| 2013/0127980 A1* | 5/2013 | Haddick | G06F 3/013 348/14.08 |
| 2015/0218872 A1* | 8/2015 | Breed | G01C 21/26 701/2 |

FOREIGN PATENT DOCUMENTS

| | | | | |
|---|---|---|---|---|
| CN | 101427154 A | 5/2009 | | |
| DE | 19943872 A1 | 3/2001 | | |
| DE | EP 1085781 A2 * | 3/2001 | ............ | G10L 15/20 |
| JP | 9238390 | 9/1997 | | |
| JP | 09238390 A * | 9/1997 | | |
| JP | 2001125594 A | 5/2001 | | |
| JP | 2009049776 A | 3/2009 | | |
| JP | 2010525646 A | 7/2010 | | |
| WO | 2007034392 A2 | 3/2007 | | |

* cited by examiner

AUDIO SYSTEM AND METHOD OF OPERATION THEREFOR

FIELD OF THE INVENTION

The invention relates to an audio system and a method of operation therefor, and in particular, but not exclusively, to an audio system capable of estimating user positions.

BACKGROUND OF THE INVENTION

Determination of presence and position related information is of interest in many audio applications including for example for hands-free communication and smart entertainment systems. The knowledge of user locations and their movement may be employed to localize audio-visual effects at user locations for a more personalized experience in entertainment systems. Also, such knowledge may be employed to improve the performance of hands-free (voice) communications, e.g. by attenuating sound from other directions than the estimated direction of the desired user.

In particular, such applications may use directional audio rendering or capture to provide improved effects. Such directionality can for example be derived from audio arrays comprising a plurality of audio drivers or sensors. Thus, acoustic beamforming is relatively common in many applications, such as in e.g. teleconferencing systems. In such systems, weights are applied to the signals of individual audio elements thereby resulting in the generation of a beam pattern for the array. The array may be adapted to the user positions in accordance with various algorithms. For example, the weights may be continually updated to result in the maximum signal level or signal to noise ratio in accordance with various algorithms. However, such conventional approaches require the audio source to be present, and consequently the weights of an acoustic array can be adapted only after a source becomes active.

This is disadvantageous in many scenarios. For example, user tracking tends to become inaccurate when there are only short bursts of acoustic activity. Such a scenario is typical for many applications including for example speech applications where the speaker typically only talks in intervals. Furthermore, beamforming can only be employed effectively after a certain duration of acoustic activity as the weight adaption takes some time to become sufficiently accurate. Also, false detections can occur in the presence of other acoustic sources. For example, if a radio or computer is producing sounds in the room the system may adapt to this sound source rather than the intended sound source, or the adaptation may be compromised by the noise source.

In order to address such issues, it has been proposed to use video cameras to perform position determination and to use the video signal to control the adaptation of the weights. However, such approaches tend to be complex, expensive and resource demanding in terms of computational and power resource usage.

Hence, an improved audio system would be advantageous and in particular a system allowing increased flexibility, reduced resource usage, reduced complexity, improved adaptation, improved reliability, improved accuracy and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an audio system comprising: an ultrasound sensor array comprising a plurality of ultrasound sensor elements; an estimator for estimating a presence characteristic of a user in response to ultrasound signals received from the ultrasound sensor array; an audio array circuit for generating a directional response of an audio band array comprising a plurality of audio band elements by applying weights to individual audio band signals for the audio band elements; and a weight circuit for determining the weights in response to the presence characteristic.

The invention may provide improved adaptation of the directionality of an audio band array. The approach may for example allow adaptation of filter characteristics for the array processing based on the ultrasound signals. Adaptation of filter characteristics and weights, and thus the directionality of the audio array, may be performed in the absence of sound being generated from a target source. Specifically, the filter characteristics/weights may be set to provide a beam or a notch in a desired direction based on the ultrasound signals.

The invention may in many embodiments provide improved accuracy and/or faster adaptation of audio directionality for the audio band array. The initialization of weights for the audio band array may for example be based on the presence characteristic.

In some embodiments, the spatial directivity pattern of the audio band array may be adjusted in response to the presence characteristic. For example, if the presence of a user is detected, a directional beam may be generated, and if no user is detected an omni-directional beam may be generated.

The audio band may be considered to correspond to an acoustic band. The audio band may be a band having an upper frequency below 15 kHz and typically below 10 kHz. The ultrasound band may be a band having a lower frequency above 10 kHz and often advantageously above 15 kHz or 20 kHz.

The weights may be filter weights of individual filters being applied to the individual audio band signals by the array processor. The weights may be complex values and/or may equivalently be delays, scale factors and/or phase shifts.

In accordance with an optional feature of the invention, the presence characteristic comprises a position estimate and the audio array circuit is arranged to determine the weights in response to the position characteristic.

This may provide improved performance and/or additional capability for many applications. The invention may e.g. allow beamforming to track users or audio sources even when they do not generate any sound. In many embodiments, it may provide a faster adaptation of a beam pattern to a specific user position.

In accordance with an optional feature of the invention, the audio band elements are audio sensors and the audio array circuit is arranged to generate a directional output signal by combining audio band signals from the audio sensors, the combining comprising applying the weights to the individual audio band signals.

The invention may allow an advantageous control of directivity for an audio capture system based on an audio band sensor array. The approach may allow for an audio band audio capture beam to be adapted even when no sound is generated by the target source. Furthermore, the approach may reduce or mitigate the impact of audio generated by undesired sound sources.

In accordance with an optional feature of the invention, the audio system comprises a plurality of wideband sensors each of which is both an ultrasound sensor of the ultrasound sensor array and an audio sensor of the audio band array.

The same wideband sensor may thus be used as both an audio band element and an ultrasound sensor. This may provide a highly cost efficient implementation in many scenarios. The approach may facilitate and/or improve interworking between the audio band processing and the ultrasound band processing. For example, the approach may in many scenarios allow reuse of parameters determined in response to the ultrasound signals when processing the audio band signals. Specifically, the approach may facilitate and/or improve synchronization between ultrasound and audio band operations and processing.

In accordance with an optional feature of the invention, the plurality of wideband sensors forms both the ultrasound sensor array and the audio band array.

Each of the audio band elements and ultrasound sensors may be implemented by a wideband sensor. The same wideband sensor array may thus be used as the audio band array and the ultrasound sensor array. The ultrasound signals and the audio band signals may be different frequency intervals of the same physical signals, namely the wideband sensor elements.

The approach may provide a highly cost efficient implementation in many scenarios. The approach may facilitate and/or improve interworking between the audio band processing and the ultrasound band processing.

In accordance with an optional feature of the invention, the audio system further comprises: a user movement model arranged to track a position of a user; an update circuit for updating the user movement model in response to both the ultrasound signals and the audio band signals.

This may provide improved performance in many embodiments and may in many scenarios provide a substantially improved user movement tracking.

In accordance with an optional feature of the invention, the update circuit is arranged to update the user movement model in response to the ultrasound signals when a characteristic of the audio band signals meets a criterion.

This may improve user movement tracking in many scenarios.

The criterion may for example be a criterion which is indicative of the desired sound source not generating any sound. As a simple example, the criterion may be a requirement that a signal level of the audio band signals is below a threshold. The threshold may be a variable threshold which varies in response to other parameters.

In accordance with an optional feature of the invention, the update circuit is arranged to not update the user movement model in response to the ultrasound signals when a characteristic of the audio band signals meets a criterion.

This may improve user movement tracking in many scenarios.

The criterion may for example be a criterion which is indicative of the desired sound source generating sound. As a simple example, the criterion may be a requirement that a signal level of the audio band signals is above a threshold. The threshold may be a variable threshold which varies in response to other parameters.

In accordance with an optional feature of the invention, the weight circuit is arranged to determine ultrasound weight delays for the ultrasound signals to correspond to a direction of an ultrasound source; and to determine audio weight delays for the individual audio band signals to correspond to the ultrasound weight delays.

This may provide facilitated and/or improved performance in many scenarios.

In accordance with an optional feature of the invention, the ultrasound sensor array and the audio band array are spatially overlapping.

This may provide facilitated and/or improved performance in many scenarios. The ultrasound sensor array and the audio band array may specifically be substantially collocated.

In accordance with an optional feature of the invention, the audio system further comprises an ultrasound transmitter arranged to transmit an ultrasound test signal, and the estimator is arranged to estimate the presence characteristic in response to a comparison between a characteristic of the ultrasound test signal and a characteristic of the ultrasound signals received from the ultrasound sensor array.

This may provide improved performance. The ultrasound transmitter may be proximal to the ultrasound sensor array and may be substantially collocated therewith. The ultrasound transmitter may in some scenarios be implemented by the same ultrasound transducer(s) as one (or more) of the ultrasound sensors.

In accordance with an optional feature of the invention, the ultrasound test signal is a pulsed ultrasound signal, and the estimator is arranged to perform a movement estimation in response to a comparison of signal segments of the ultrasound signals corresponding to different pulses.

This may provide a particularly practical and/or improved movement detection that may in many scenarios improve performance of the audio system as a whole.

In accordance with an optional feature of the invention, the estimator is arranged to estimate a position of a moving object in response to a difference between the signal segments.

This may provide a particularly practical and/or improved movement detection that may in many scenarios improve performance of the audio system as a whole.

In accordance with an optional feature of the invention, the audio band elements are audio drivers arranged to generate a sound signal in response to a drive signal, and the individual audio band signals are drive signals.

The invention may allow improved performance and or facilitated implementation and/or operation of an audio system providing a directional sound reproduction. The approach may for example allow optimization of audio rendering for a specific listening position.

According to an aspect of the invention there is provided a method of operation for an audio system including an ultrasound sensor array comprising a plurality of ultrasound sensor elements, the method comprising: estimating a presence characteristic of a user in response to ultrasound signals received from the ultrasound sensor array; generating a directional response of an audio band array comprising a plurality of audio band elements by applying weights to individual audio band signals for the audio band elements; and determining the weights in response to the presence characteristic.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

Figure 1:
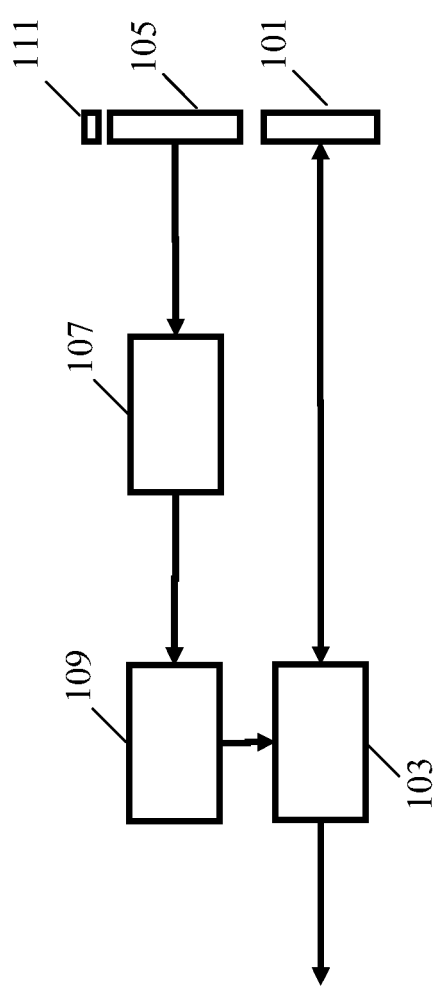
FIG. 1 illustrates an example of an audio system in accordance with some embodiments of the invention.

FIG. 1 illustrates an example of an audio system in accordance with some embodiments of the invention.

The audio system comprises an audio band array 101 which comprises a plurality of audio band elements/transducers. The audio band array 101 may be used to provide directional operation of the audio system by individually processing the signals for each of the audio band elements. Thus, the combined effect of the audio band array 101 may correspond to a single audio band element having a directional audio characteristic.

The audio band array 101 is coupled to an array processor 103 which is arranged to generate a directional response from the audio band array by individually processing the signals of the individual signals of the individual audio band elements.

In some embodiments, the audio band array 101 may be used to render sound and the audio band elements/transducers may be audio band drivers/speakers. Thus, an input signal may be applied to the array processor 101 which may generate the individual drive signals for the audio band drivers by individually processing the input signal. Specifically, filter characteristics/weights may be set individually for each of the audio band drivers such that the resulting radiated audio band signals add or subtract differently in different directions. For example, coherent addition can be produced in a desired direction with non-coherent (and thus reduced signal levels) are produced in other directions.

In some embodiments, the audio band array 101 may be used to capture sound and the audio band elements/transducers may be audio band sensors. Thus, an output signal may be generated by the array processor 101 by individually processing the individual sensor signals from the audio band sensors and subsequently combining the processed signals. Specifically, filter characteristics/weights may be set individually for each of the audio band sensors such that the combination is more or less a coherent combination in the desired direction.

Figure 2:
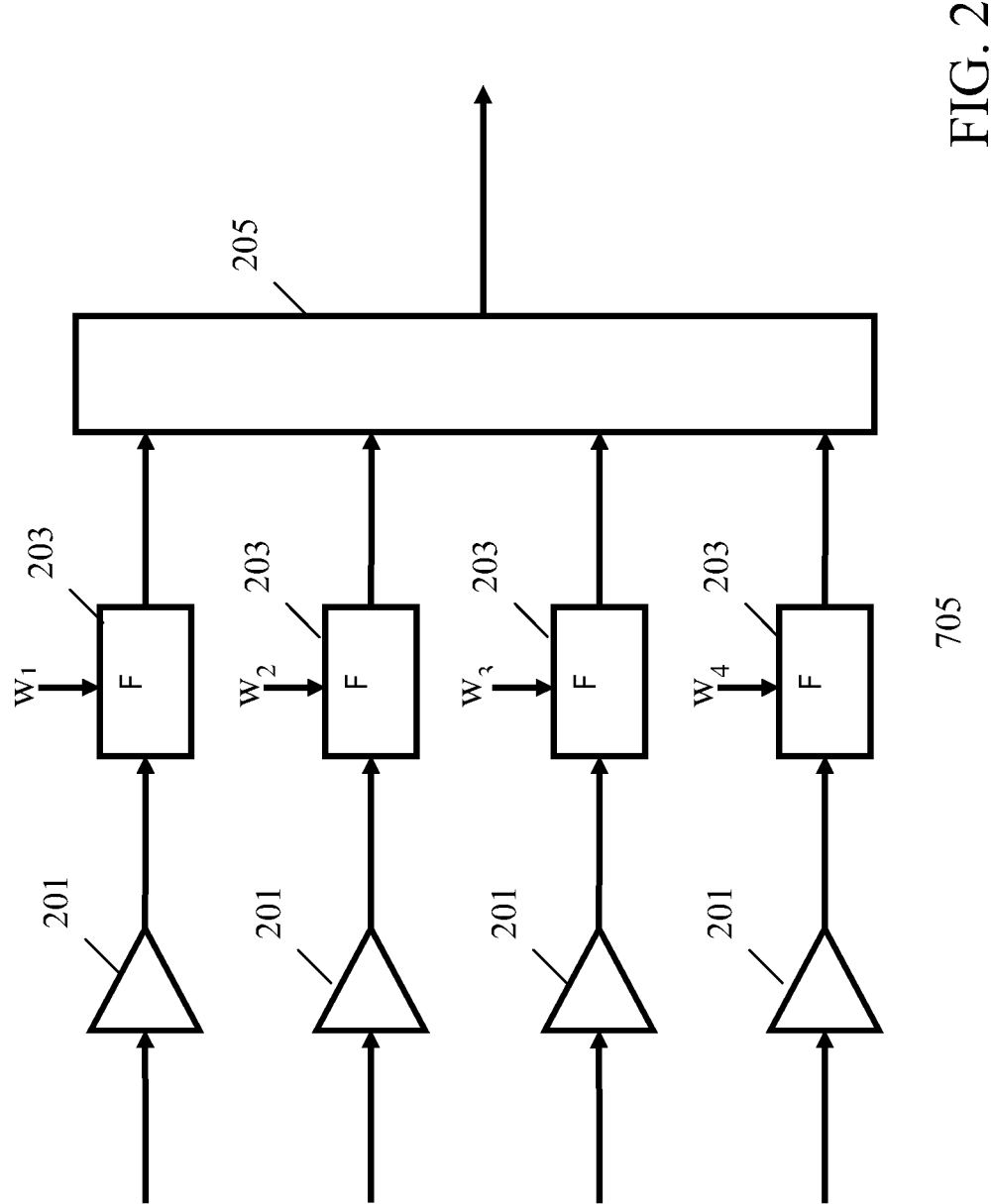
FIG. 2 illustrates an example of a beamformer for an audio sensor array.

FIG. 2 illustrates an example wherein four input sensor signals are received from four audio band sensors. It will be appreciated that the array may in other embodiments comprise fewer or more elements. Each of the signals is amplified in an individual low noise amplifier 201 after which each signal is filtered in an individual filter 203. The resulting filtered signals are then fed to a combiner 205 which may e.g. simply sum the filter output signals.

Figure 3:
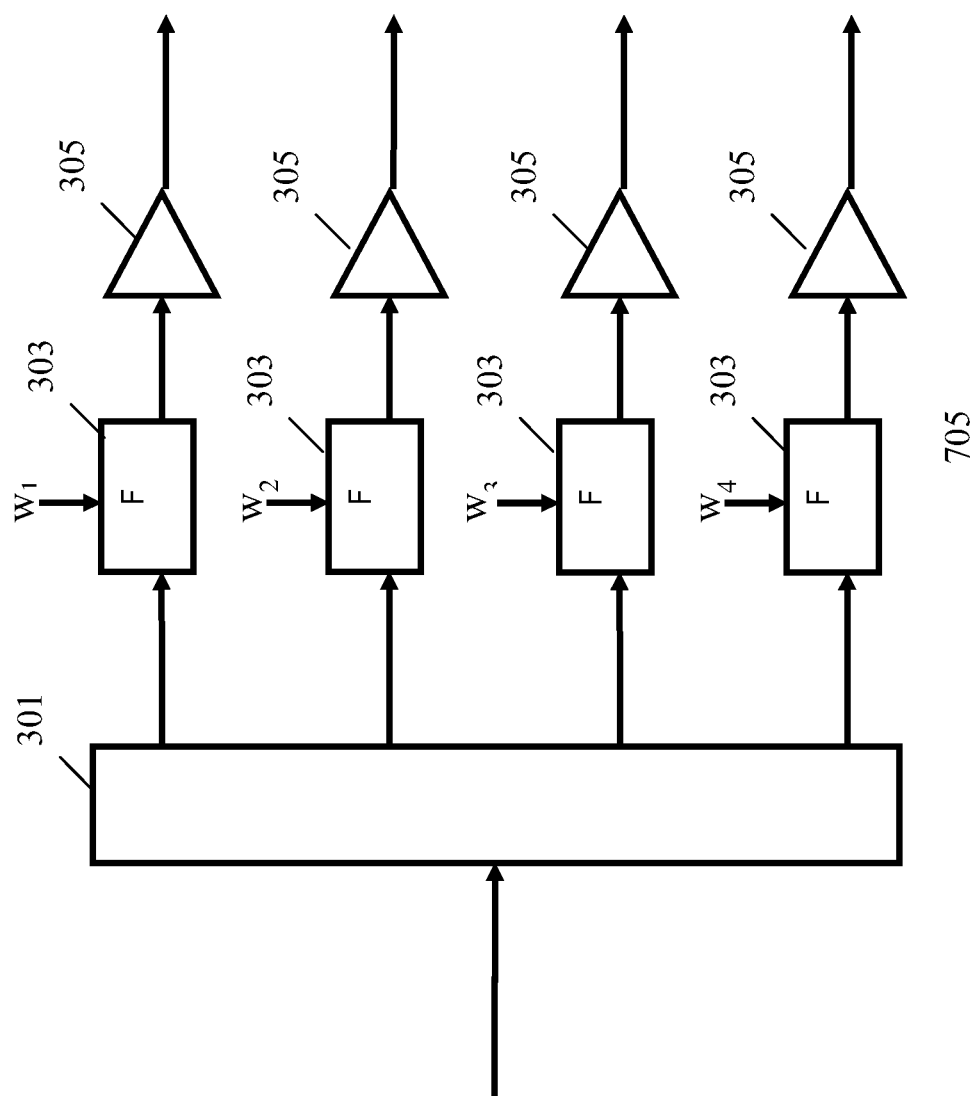
FIG. 3 illustrates an example of a beamformer for an audio rendering array.

FIG. 3 illustrates an example wherein an input signal is received by a splitter 301 which generates four signals, one signal for each of four audio band drivers. Each of the signals is then filtered in an individual filter 303 after which each filter output signal is amplified in a suitable output amplifier 305. Each of the output amplifiers thus generates a drive signal for an audio band driver.

The directionality of the audio band array can thus be controlled by suitably adapting the individual filters 203, 303. Specifically, the filters 203, 303 can be adapted such that coherent summation is achieved for a desired direction.

The directionality of the audio band array can accordingly be modified dynamically simply by changing the characteristics of the filter. Thus, the audio band beam/pattern of the audio band array can be controlled by modifying the weights of the filters as will be known to the skilled person.

The modification of the filter weights may specifically correspond to a modification of one or more of a gain, a phase and a delay. Each of these parameters may be constant for all frequencies or may be frequency dependent. Further, modifications of the filter weights may be performed in the frequency domain and/or the time domain. For example, time domain adaptation may be performed by adjusting coefficients (taps) of a FIR filter. As another example, the signals may be converted to the frequency domain by a Fast Fourier Transform. The resulting frequency domain signal may then be filtered by applying coefficients/weights to each of the frequency bin values. The resulting filtered frequency domain signal may then be converted back to the time domain by an inverse Fast Fourier Transform.

As a low complexity example, the filters 203, 303 may simply correspond to a variable delay. It is noted that a simple delay corresponds to a filter having an impulse response corresponding to a Dirac pulse at a time position corresponding to the delay. Thus, introducing a variable delay corresponds to introducing a filter wherein the coefficients are weighted to provide the desired delay (e.g. it is equivalent to a FIR filter where the coefficient corresponding to the delay is set to one and all other coefficients are set to zero. For fractional delays (relative to sample instants) FIR interpolation may be considered).

Thus, the approach may correspond to a Delay and Sum Beamformer (DSB) for the audio band sensor case.

In some embodiments, more complex filtering may be performed and specifically a frequency dependent filtering may be applied. Thus, the approach may correspond to a Filter and Sum Beamformer (FSB) for the audio band sensor case.

It will be appreciated that in some embodiments further processing of the individual signals may be performed. For example, gain adjustment or compensation may be introduced for an audio band rendering system. E.g. calibration may be performed to compensate for variations in the characteristics of the audio band drivers.

As another example, the combination of the audio band sensor example may take other signals into account and may for example subtract signals that are derived from the individual signals. For example, side-lobe cancelling may be introduced by subtracting a suitably generated estimate of such signals.

Various algorithms are known for controlling weights of an audio band beamformer. Generally these algorithms determine weights for the audio band beamformer based on knowledge of a desired directivity and accordingly determines the weights based e.g. on predetermined values relating directions to weights (e.g. using a look up table). For the audio band sensor case, the weights are typically adapted in a feedback fashion based on the received audio. For example, the weights are dynamically adapted to provide a maximum signal level or a maximum signal to noise ratio estimate.

However, in the system of FIG. 1 the adaptation of the filter characteristics are alternatively or additionally dependent on the ultrasound audio environment. The system comprises an ultrasound sensor array 105 which comprises a plurality of ultrasound sensors that generate a plurality of ultrasound signals. The ultrasound signals are fed to an estimation processor 107 which is arranged to generate a presence estimate for a user in response to the ultrasound signals. The estimation processor 107 is coupled to a weight processor 109 which is further coupled to the array processor 103. The weight processor 109 is arranged to determine the filter characteristics for the array processor 103 in response to the presence estimate.

The system thus uses characteristics estimated from the ultrasound audio environment to control the operation in the audio band. The ultrasound band may be considered to be from 10 kHz and whereas the audio band may be considered to be the frequency range below 15 kHz. The audio band will thus include frequency intervals below 15 kHz.

In the specific example of FIG. 1, the system further comprises an ultrasound transmitter 111 which is arranged to radiate ultrasound signals. Such signals will be reflected by objects in the room and the reflected signals or echoes can be captured by the ultrasound sensor array 105.

Thus, in the system of FIG. 1 the filter characteristics and weights may fully or partially for at least some of the time be dependent on the received ultrasound signals and specifically on echoes from radiated ultrasound signals. The estimation processor 107 receives the ultrasound signals from the sensor array 105 and based on these it estimates a presence characteristic for a user. The presence characteristic may in a simple example simply indicate whether a user is estimated to be present or not. However, in most embodiments, the presence characteristic is an indication of a position of a user. It will be appreciated that a full position estimate need not be determined but that in some embodiments, the weight processor 107 may e.g. simply estimate a rough direction to the user. Based on the determined presence characteristic, the weight processor 107 proceeds to determine suitable weights to result in a desired beam pattern for the specific presence characteristic.

As a simple example, the audio system may be set up in an environment wherein the ultrasound transmitter 111 does not generate any significant echoes at the ultrasound sensor array 105 (e.g. in a large empty space where all objects are sufficiently far away to not generate significant echoes). However, when a user enters an area in front of the ultrasound transmitter 111 and ultrasound sensor array 105, a significant echo may be generated. The estimation processor 107 may perform a very simple detection by comparing the ultrasound signal level to a threshold and setting the presence indicator to indicate a presence of a user if the threshold is exceeded and otherwise setting it to indicate that no user is detected. The weight processor 107 may then proceed to modify the weights accordingly. For example, if no user is present the weights may be set to provide a pattern which is as omnidirectional as possible, and if a user is detected the weights may be set to provide a predetermined narrow beam in the direction of a nominal position where the user is assumed to be (e.g. directly in front of the ultrasound sensor array 105). Such an approach may be suitable for many applications and can be used for both audio rendering/ playback and for audio capturing. E.g. when no user is present sound is radiated in all directions and/or captured from all directions. This may support peripheral users in different positions. However, when a user steps in front of the system, the audio system automatically adapts to focus on this specific user.

It will be appreciated that the system seeks to determine a presence/position characteristic for a user but may not know if the ultrasound signals are caused by a user or other object. Thus, the presence characteristic may be considered to be a presence characteristic for an object. The object may then be assumed to be the user.

In many embodiments, the presence characteristic may comprise or consist of a position (direction) estimate for user and the weight processor 107 may be arranged to determine weights to provide a suitable pattern for this direction (e.g. by directing a beam in that direction). The audio system may thus use ultrasound measurements to adjust the directivity of an audio band beam.

In many scenarios, the ultrasound sensor array 105 and the audio band array 101 may be substantially collocated and may e.g. be adjacent to each other. However, in many embodiments the ultrasound sensor array 105 and the audio band array 101 may advantageously overlap each other. Thus, for an audio capture application, the apertures of the ultrasound sensor array 105 and the audio band (sensor) array 101 may overlap each other. An example is where ultrasound sensors are placed in-between audio band sensors such that the arrays are interleaved with each other. Such an approach provides for improved and facilitated operation and increased accuracy. Specifically there is no necessity for complex calculations to translate positions relative to the ultrasound sensor array 105 to positions relative to the audio band array 101. Rather, if an estimated direction to a user is determined based on the ultrasound signals, this direction can be used directly when determining suitable filter weights for the audio band signals.

In the following, more specific examples of the system will be described. The description will focus on an audio capture system which adapts the audio beam pattern towards a desired sound source. The audio system may for example be a teleconferencing system.

Figure 4:
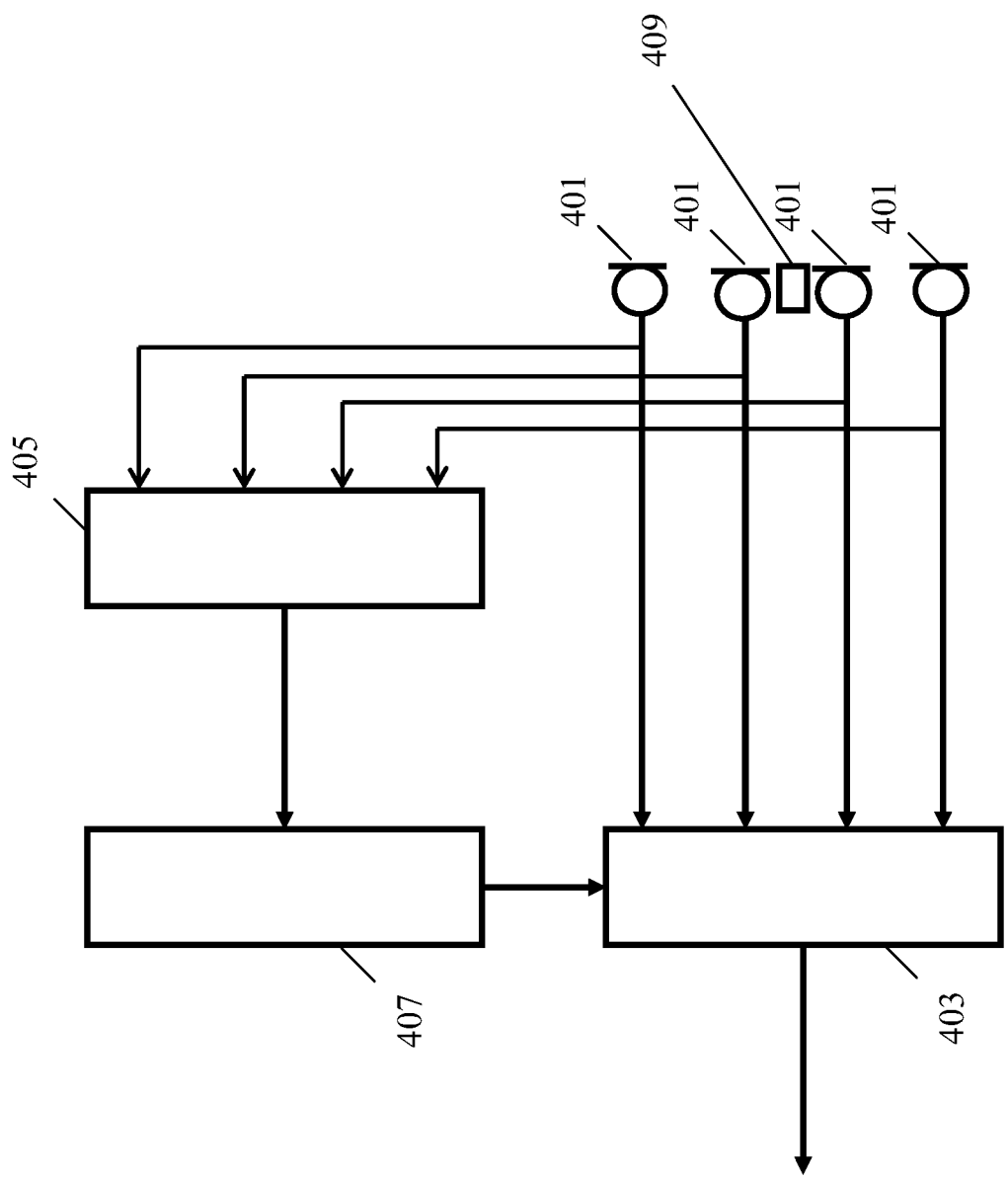
FIG. 4 illustrates an example of an audio system in accordance with some embodiments of the invention.

In the example, the ultrasound sensor array 105 and the audio band array 101 are not only collocated or overlapping but actually use the same audio band elements. FIG. 4 illustrates an example of the exemplary audio capture system.

The system of FIG. 4 comprises an audio band array of audio band transducers in the form of wideband audio band sensors 401. Each of the wideband audio sensors 401 captures sound in a wideband range which covers at least part of the audio band and the ultrasound band. Indeed the active frequency interval for capture by the wideband audio sensors 401 includes frequencies below 2 kHz and above 10 kHz (or below 500 Hz or 1 kHz and/or above 15 kHz or 20 kHz in many scenarios).

Thus, each of the wideband audio sensors 401 is both an audio band sensor and an ultrasound sensor. Hence, the same sensors are used both to provide the captured audio input as well as the ultrasound input.

The wideband audio sensors 401 are coupled to an array processor 403 which proceeds to filter and combine the audio band signals as described for the array processor 103 of FIG. 1. However, in many scenarios the array processor 103 may further low pass filter the signals to limit the signals to the audio band.

Figure 7:
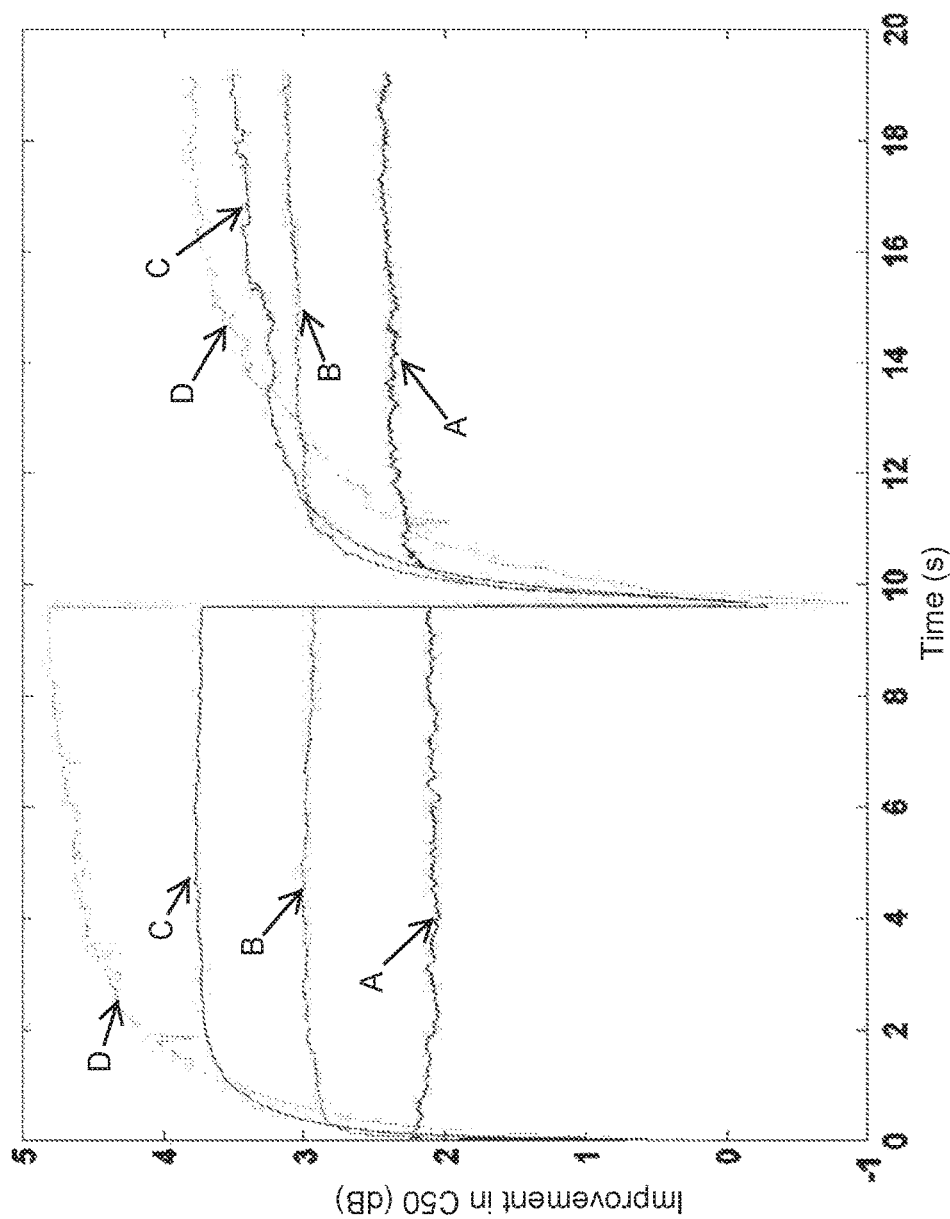
FIGS. 7-9 illustrate examples of performance for a de-reverberation application.

Similarly, the wideband audio sensors 401 are coupled to an estimator 405 which is arranged to determine a presence characteristic for a user along the same lines as the presence estimator 107 of FIG. 7. The estimator 405 is coupled to a weight processor 407 which is arranged to determine the weights for the array processor 403 based on the presence characteristic corresponding to the approach of the weight processor 107 of FIG. 1.

In the system where the same transducer signals are used both for the audio band and ultrasound processing, the respective ultrasound signals may e.g. be generated by a high pass filtering of the transducer signals and the audio band signals may be generated by a low pass filtering of the transducer signal.

An audio band signal may have at least 80% of the total signal energy below 10 kHz whereas an ultrasound signal may have at least 80% of the total signal energy above 10 kHz.

The system further comprises an ultrasound transmitter 409 which is located centrally in the audio array 401.

The system of FIG. 4 may operate similarly to that described for the capture application of FIG. 1. However, typically, the system may specifically be used to estimate user positions based on the ultrasound signals, and this position estimate may be used to fully or partially control the weights of the audio band combining in order to provide a desired directive sensitivity of the audio capture.

It will be appreciated that the weights may not only be determined based on the presence or position estimate generated from the ultrasound signals but may in some scenarios alternatively or additionally be generated based on the audio band signals captured by the audio array 401 (and typically generated by filtering of these or in some cases used directly when the ultrasound signal components are negligible when performing the audio band processing). For example, the audio system may include conventional functionality for adapting the weights of a beamformer for an audio array. However, during intervals of no sound or at initialization, the ultrasound signals can be used to determine suitable weights which can be used for the beamforming algorithm. Thus, initialization of an audio beamforming algorithm may be performed using the weights determined from the ultrasound signals.

The use of wideband sensors as both audio band and ultrasound sensors provide a number of advantages. Indeed, it may facilitate implementation and manufacturing as fewer sensors are used. This may reduce cost and often reduce the form factor of the sensor segment of the audio system. It may for example allow implementation of a teleconferencing audio system using the described approach in a single relatively small enclosure. However, the approach may further provide improved performance and may in particular provide higher accuracy and/or reduced or facilitated signal processing with reduced complexity. Indeed, the translation between different audio band and ultrasound sensor arrays may often be substantially facilitated. Indeed, in many scenarios the parameters determined to result in a coherent addition for the ultrasound signals may directly be used as parameters for the audio beamforming. E.g. the same delays may be used for each individual path.

As a specific example, the system may be used in for hands-free communication where one or more users communicate with remotely located users using a fixed system. In order to provide a high quality interface, acoustic beamforming can be performed in order to localize the sources and direct the acoustic beam to those locations. However this conventionally requires sources to be (acoustically) active. In conventional systems, during and immediately after periods of inactivity, the beamforming weights need to be updated if the sources have moved, leading to drops in quality. As an example scenario, consider an active source at a certain location. The source goes quiet and moves to another location and then again becomes active. Communication would initially suffer since the acoustic beamformer weights need updating. Also if there are non-human acoustic sources like a TV or notebook operating in the environment, the beamforming weights that are computed could be inaccurate resulting in poor quality or even a communication outage.

However, in the present system, such disadvantages can be mitigated by the ultrasound signals being used to track and update the weights during intervals without acoustic activity. Furthermore, external noise sources are unlikely to affect the ultrasound processing thereby providing more reliable estimates which could be used in case of excessive undesired noise.

In many embodiments, the presence characteristic is thus a position estimate or indication, such as e.g. a direction of the assumed user. The position estimate can be determined in response to the ultrasound signal transmitted by the ultrasound transmitter 409. In particular the signal components in the ultrasound band can be used to compute user locations based on time-of-flight processing which allows a computation of range and/or direction-of-arrival processing for angular information.

In the following, an example will be described based on the ultrasound transmitter transmitting a pulsed signal, e.g. such as the one illustrated in FIG. 5. In the example, T denotes the duration over which the pulse comprising sinusoids is transmitted and PRI denotes the duration over which echoes may be received.

The estimator 405 may for each pulse correlate the received ultrasound signal from each wideband audio sensor to delayed versions of the transmitted pulse. The delay which results in the largest correlation can be considered to correspond to the time of flight for the ultrasound signal and the relative difference in the delays (and thus the times of flight) between the array elements can be used to determine a direction towards the object reflecting the ultrasound.

In some embodiments, the ultrasound signals are also used to provide a motion estimate for the user. Specifically, the ultrasound position estimate may be based on moving objects, i.e. on changes in the echoes received by the wideband sensors.

Figure 5:
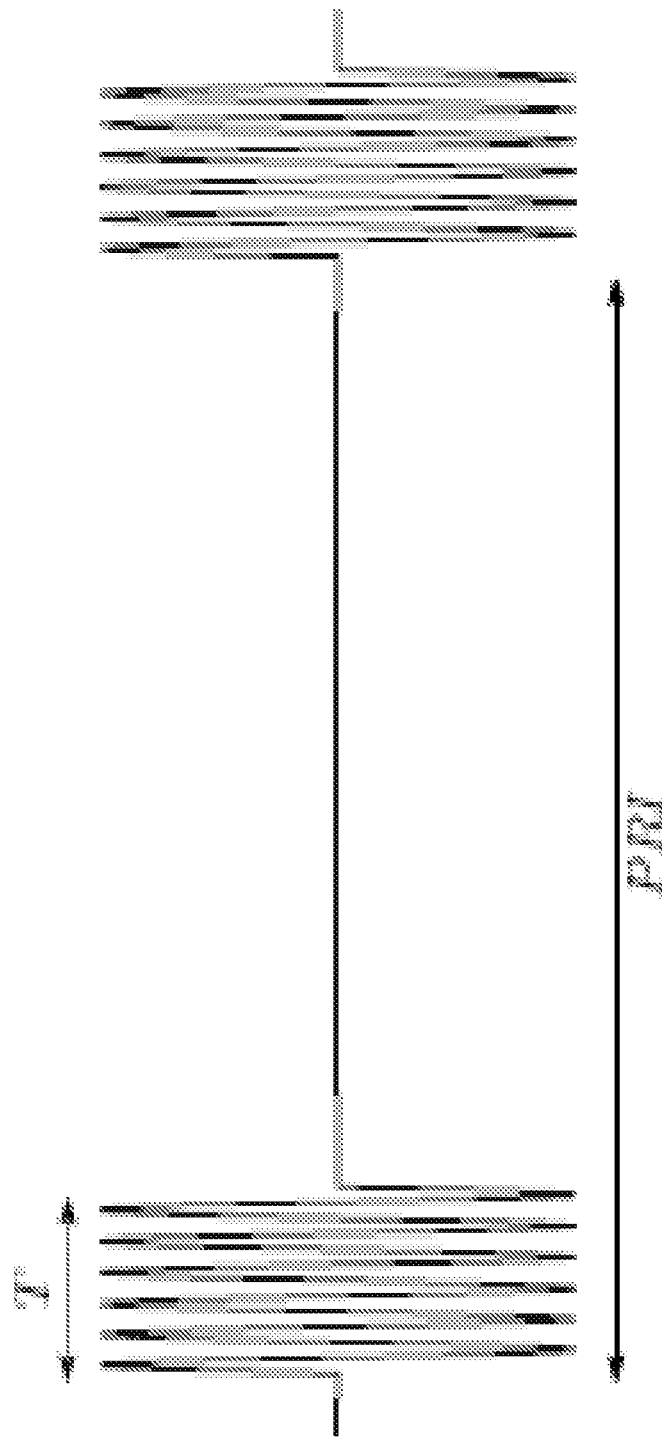
FIG. 5 illustrates an example of a transmitted ultrasound signal.

For example, the ultrasound transmitter may emanate a series of pulses, such as those of FIG. 5. The estimator 405 may then proceed to first determine the range of the moving sources only from the wideband sensor array 401 while discarding static objects from consideration. The estimator 405 in the example proceeds to consider the difference of the received signals from two consecutive transmit pulses rather than consider each response individually. Echoes from static objects result in the same contribution in received signals from consecutive transmit pulses, and hence the difference would be (close to) zero. Echoes from moving sources on the other hand result in a non-zero difference signal. Signal power is then computed per range bin based on the difference signal. A moving source is determined to be present at a certain range bin if the computed signal power exceeds a detection threshold. The detection threshold may be adapted to ambient noise conditions. Having determined the radial range, the angular position may be calculated by determining the direction-of-arrival (DoA) of the moving sources. The range along with the angle gives the instantaneous location of each moving source.

The location estimate (azimuth) provided by the ultrasound array can be translated into the relative delays that occur when an audio signal emanating from that location propagates to the audio sensors of the array 401, For clarity and simplicity, and without loss of generality; a uniform linear audio sensor array is assumed with an inter-element spacing of d m. Let $\theta_{us}$ denote the estimate of the location of the audio source (the object reflecting the ultrasound signals) relative to the wideband sensor array 401.

Assuming a far-field model and therefore planar wave propagation, the delay in seconds at sensor i of the array, relative to the first sensor is given by $$\tau_i = \frac{(i-1)\cos\theta_{us}}{c},$$

where c is the speed of sound in air. The signal received at sensor i can be written as:

$$x_i(t) = s(t-\tau_i) + n_i(t),$$

where s(t) is the desired sound and $n_i(t)$ is the noise signal at sensor i.

The relative delays required for forming a beam in the direction of the assumed user can now be computed from the location estimate provided by the ultrasound array. The signals from the audio sensors can specifically be compensated such that the signals for the determined direction add coherently in a Delay-and-Sum Beamformer (DSB) structure:

$$\hat{s}(t) = \Sigma_i x_i(t+\tau_i).$$

It will be appreciated that the above equation can be implemented by appropriately delaying the input signals to ensure causality.

A particular advantage of many systems wherein the audio band array and ultrasound array are closely located, and in particular of a system wherein the same sensors provide both the ultrasound and audio band signals, is that the estimate of the relative delays $\tau_i$ obtained from the ultrasound signals can directly be used for the audio band signal.

This avoids the potential loss in accuracy in having to translate the delays to a location estimate relative to the ultrasound array, and then translate this position back to delays for an audio band array which may be located elsewhere.

Thus, in many embodiments the audio system may directly determine ultrasound weight delays for the ultrasound signals that correspond to a direction of an ultrasound source (such as a reflecting object). The audio band weight delays for the individual audio band signals may then directly be used to correspond to the ultrasound weight delays. In such scenarios the presence characteristic may indeed be represented by the determined delays themselves.

It is noted that although the approach has been described with specific reference to a DSB it is also applicable to e.g. more complex beamformers such as a Filter-Sum-Beamformer (FSB) or a sidelobe cancelling beamformer.

The approach may provide a number of advantages. For example, resetting the filters to the delays corresponding to the location determined by the ultrasound signals after a period of acoustic inactivity by the user, and then allowing the filters to adapt when the audio band becomes active ensures faster convergence than the case where the filters corresponding to the old location need to be adapted.

The audio system of FIG. 1 may be arranged to track movement of a user, where the estimated movement is updated using both the results from the audio band and from the ultrasound band. The audio beamforming may then be based on the current position estimate for a user. For example, past location information can be combined with a movement model to obtain user movement trajectories, where the model may be continuously updated based on the current position estimated from either the audio band signals, the ultrasound signals, or from both. The user movement model may for example be a simple model which e.g. simply uses the last estimated position as the current position, or may be more complex and for example implement complex movement models that may predict movement and combine position estimates from both the ultrasound and audio bands. The location and movement trajectory information may e.g. then be used as a priori input to the acoustic beamformer, i.e. the array processor 403 may after a pause in the audio from the desired signal source be initialized with weights corresponding to the estimated user position.

This may be particularly advantageous e.g. when the audio source is a person who moves from location A to location B without talking. An audio-only system is unable to track this movement due to the absence of an audible signal, and needs time to converge to the correct weights once the person starts talking from location B. Using the location estimated from the ultrasound array solves this problem as it can continuously track the user during the movement for location A to location B.

Figure 6:
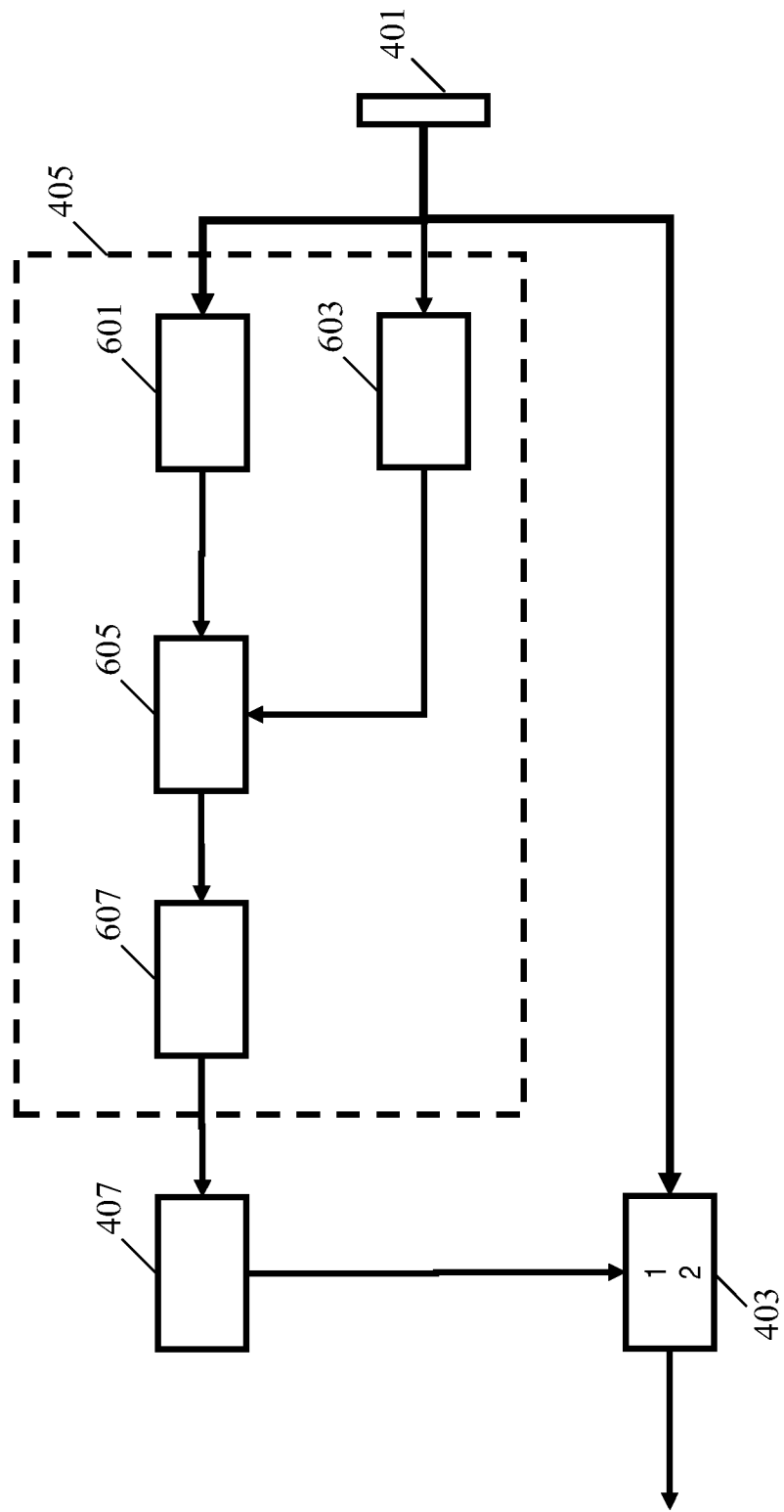
FIG. 6 illustrates an example of an audio system in accordance with some embodiments of the invention.

FIG. 6 illustrates an example of how the audio system of FIG. 4 may be implemented using a movement model which is updated on the basis of position estimates generated both from the ultrasound signals and from the audio band signals.

In the example, the estimator 405 comprises an ultrasound position estimator 601 which receives the signals from the wideband audio sensors 401 and which generates a position estimate from the ultrasound signal components. The previously described approach may for example be used.

The estimator 405 further comprises an audio band position estimator 603 which receives the signals from the wideband audio sensors 401 and which generates a position estimate from the audio band signal components. It will be appreciated that any suitable algorithm may be used, including for example an adaptive algorithm determining relative delays that result in the maximum summed signal level. It will also be appreciated that in some embodiments, the position determination may be integrated with the beamforming process of the array processor 403 e.g. by the audio system including a feedback path from the array processor 403 to the audio band position estimator 603.

The ultrasound position estimator 601 and the audio band position estimator 603 are coupled to an update processor 605 which is further coupled to a movement model 607. The movement model 607 is a model that generates a position estimate for the user. The update processor 605 controls the movement model based on the position estimates from the ultrasound position estimator 601 and the audio band position estimator 603.

As a simple example, the movement model 607 may simple comprise a memory which stores the latest position estimate provided by the update processor 605. The update processor 605 may continuously evaluate the ultrasound and audio band position estimates and proceed to feed forward the position estimate that is considered to be valid. If both are considered valid, an average position estimate may be forwarded, and if none of them are considered valid no position estimate is forwarded.

It will be appreciated that any suitable approach for determining whether a position estimate is valid may be used. For example, the position estimate may simply be considered valid if the signal level of the combined signal is above a given threshold and otherwise may be considered to be invalid.

In some embodiments, the ultrasound position estimate may thus be used if the audio band signals meet a criterion.

For example, if the audio band signals do not combine to generate a sufficiently high signal level, the user model is not updated on the basis of the audio band position estimate but instead the user model is updated on the basis of the ultrasound position estimate. Thus, if it is likely that the user is not speaking, the ultrasound signals are used for position estimation.

In some embodiments, the ultrasound position estimate may not be used if the audio band signals meet a criterion. For example, if the audio band signals do combine to generate a sufficiently high signal level, the user model is not updated on the basis of the ultrasound position estimate but instead the user model is updated on the basis of the audio band position estimate. Thus, if it is likely that the user is speaking, the audio band signals are used for position estimation.

Thus, in some embodiments array processing may be switched between ultrasound and audible-sound e.g. in order to save power resulting from active ultrasound transmission. Hence, when audible activity (in the human hearing range of frequencies) is detected, the system switches from ultrasound mode to an audio band mode. During the switch, the audio beamforming weights are initialized with the latest location estimates provided by the ultrasound signals. As long as audible activity persists, the audio band signals are used for user localization. When audible activity levels fall below a set threshold, the system switches to the ultrasound mode.

As another example, improved detection performance may be achieved using joint ultrasound and audio band localization as follows. In the ultrasound mode, if no user is detected possibly because of lack of significant movement over a duration of time, the system may switch to the audio band mode if the audible activity is above a set threshold. This may improve overall user detection. The system may return to the ultrasound mode if movement is detected. Alternately, the system may stay in the audio band mode as long as audible activity remains above the set threshold.

An example of the advantages that can be achieved by the system can be demonstrated by consideration of a dereverberation application where beamforming is used to reduce the amount of reverberation captured by the array. Reverberation affects the clarity of speech, which can be quantified through the clarity index or C50, which is the ratio (in dB) of the energy of the sound arriving at the ear within 50 ms after it is generated to the energy of the sound that arrives after 50 ms. The performance of beamformers that perform dereverberation can thus be measured by the improvement in the clarity index that results from processing.

FIG. 7 illustrates an example of the improvement in C50 provided by a conventional beamformer for four different filter lengths, i.e. waveform A for length 128, waveform B for length 256, waveform C for length 512, and waveform D for length 2024. The user is in front of the array for the first approx. 10 s, and at an angle of 45 degrees for the next 10 s. When the user changes location, it can be seen that there is a sharp drop in performance, and the system needs several seconds to converge, especially when long filters are used. This is a significant problem in many hands-free communication systems where the user is free to move during a conversation.

Figure 8:
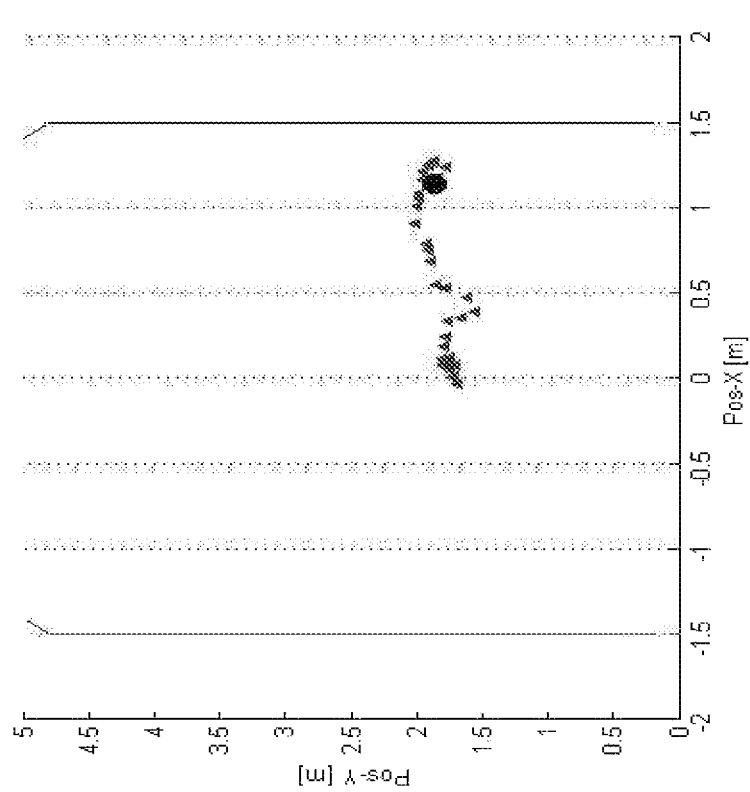

Such a problem may be mitigated in the audio system of the described approach as the system may continually track users using ultrasound signals and/or acoustic signals. Specifically, as illustrated in FIG. 8, tracking may be performed using ultrasound signals as the user moves from in front of the sensor (0 degrees) to an angle of 45 degrees.

Figure 9:
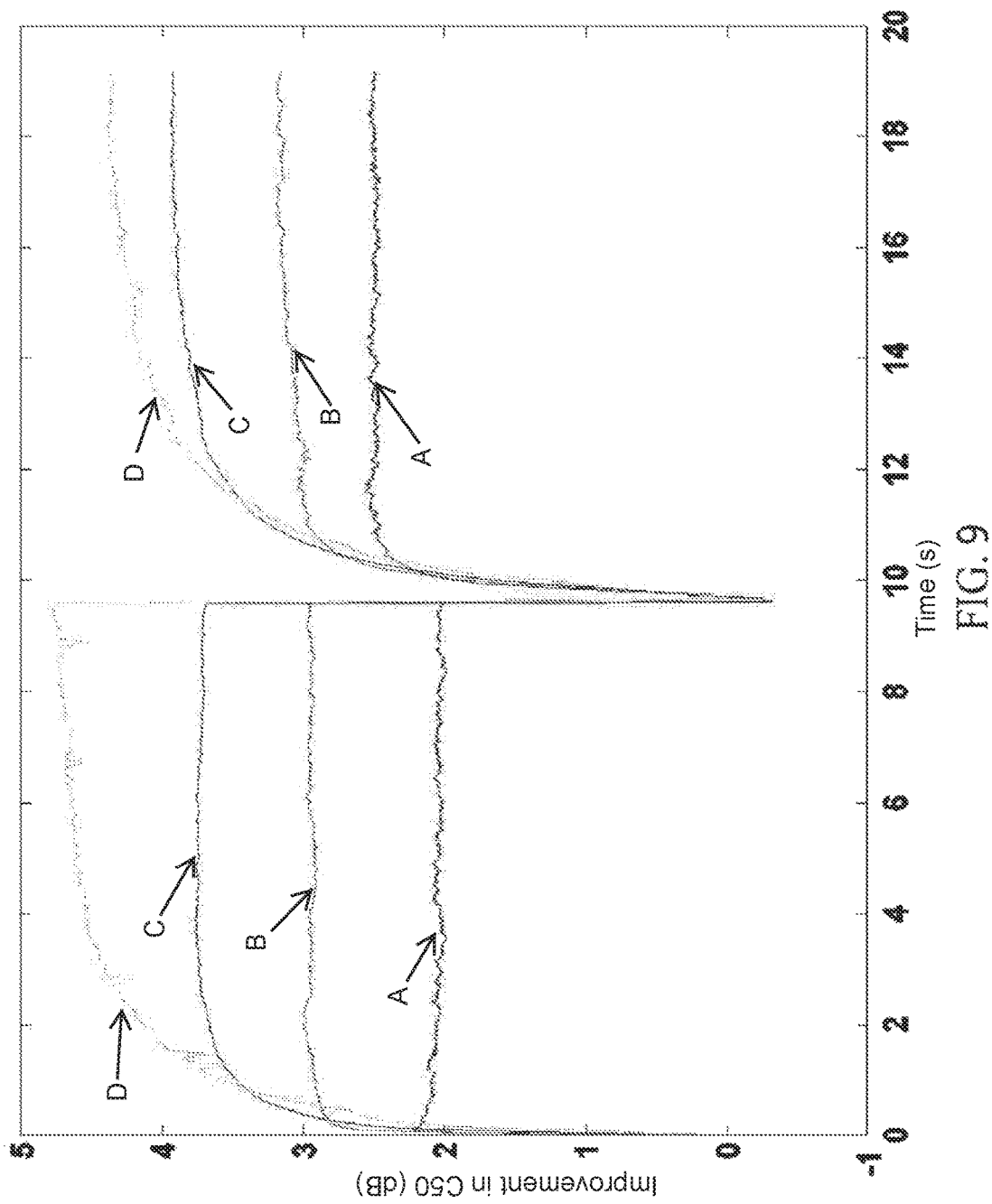

This change in location is provided as input to the beamformer. The beamformer weights can then be reset to the delays corresponding to the new location. FIG. 9 illustrates the corresponding improvement in C50 for the four waveforms A-D corresponding to the differing filter lengths as in FIG. 7. Clearly, faster convergence can be observed when accurate location estimates are provided.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. An audio system comprising:
an ultrasound transmitter configured to transmit an ultrasound test signal;

an ultrasound sensor array comprising a plurality of ultrasound sensor elements;

an estimator configured to estimate a presence characteristic of a user in response to a comparison between a characteristic of the ultrasound test signal and a characteristic of ultrasound signals received from the ultrasound sensor array, the ultrasound signals being reflected signals of the ultrasound test signal;

an audio band array comprising audio band elements;

an audio array circuit configured to generate a directional response of the audio band array by applying weights to individual audio band signals of the audio band elements; and a weight circuit configured to determine the weights in response to the presence characteristic.

2. The audio system of claim 1, wherein the presence characteristic comprises a position estimate and the audio array circuit is configured to determine the weights in response to the position estimate.

3. The audio system of claim 1, wherein the audio band elements are audio sensors and the audio array circuit is configured to generate a directional output signal by combining the individual audio band signals from the audio sensors, the combining comprising applying the weights to the individual audio band signals.

4. The audio system of claim 3, further comprising a plurality of wideband sensors each of which is both an ultrasound sensor of the ultrasound sensor array and an audio sensor of the audio band array.

5. The audio system of claim 4, wherein the plurality of wideband sensors forms both the ultrasound sensor array and the audio band array.

6. The audio system of claim 3, further comprising:

a user movement model configured to track a position of the user; and an update circuit configured to update the user movement model in response to both the ultrasound signals and the audio band signals.

7. The audio system of claim 6, wherein the update circuit is configured to update the user movement model in response to the ultrasound signals when a characteristic of the audio band signals meets a criterion.

8. The audio system of claim 7, wherein the criterion is a signal level of the audio band signals being below a threshold, wherein the update circuit is configured to switch to an ultrasound mode to update the user movement model based on the ultrasound signals.

9. The audio system of claim 6, wherein the update circuit is configured to not update the user movement model in response to the ultrasound signals when a characteristic of the audio band signals meets a criterion.

10. The audio system of claim 9, wherein the ultrasound test signal is a pulsed ultrasound test signal, and wherein the estimator is configured to perform a movement estimation in response to a comparison of signal segments of the ultrasound signals corresponding to different pulses of the pulsed ultrasound test signal.

11. The audio system of claim 10, wherein the estimator is configured to estimate a position of a moving object in response to a difference between the signal segments.

12. The audio system of claim 9, wherein the criterion is a signal level of the audio band signals being above a threshold, the threshold being a variable threshold, and wherein the update circuit is configured to switch to an audio band mode to update the user movement model based on the audio band signals.

13. The audio system of claim 6, wherein the user movement model comprises a memory for storing stored positions of the user, the stored positions representing presence characteristics of the user estimated by the estimator, wherein the update circuit is configured to continually update the memory in response to both the ultrasound signals and the audio band signals, wherein the user movement model is configured to obtain a user movement trajectory based on combining the stored positions, wherein the user movement model uses a last stored position as the current position, and wherein the user movement model is configured to predict movement of the user based on the user movement trajectory and the last stored position.

14. The audio system of claim 1, wherein the weight circuit is configured to determine ultrasound weight delays for the ultrasound signals to correspond to a direction of an ultrasound source, and wherein the weight circuit is configured to determine audio weight delays for the individual audio band signals to correspond to the ultrasound weight delays.

15. The audio system of claim 1, wherein the ultrasound sensor array and the audio band array are spatially overlapping.

16. The audio system of claim 1, wherein the audio band elements are audio drivers configured to generate a sound signal in response to a drive signal, and wherein the individual audio band signals are drive signals.

17. The audio system of claim 1, wherein the presence characteristic of the user is different than a position of the ultrasound transmitter.

18. The audio system of claim 1, wherein the ultrasound transmitter is proximal to the ultrasound sensor array and collocated therewith.

19. The audio system of claim 1, wherein the estimator is configured to estimate the presence characteristic of the user in response to a comparison between the characteristic of the ultrasound signals and a threshold.

20. The audio system of claim 1, wherein the presence characteristic comprises a motion estimate of the user, and wherein the estimator is configured to estimate the motion estimate based on changes in the reflected signals received by the ultrasound sensor array.

21. The audio system of claim 1, wherein the audio array circuit is configured to generate a directional output signal as the directional response when the presence characteristic of the user is detected, and wherein the audio array circuit is configured to generate an omni-directional output signal as the directional response when no presence characteristic of the user is detected.

22. A method of operation for an audio system having an ultrasound sensor array comprising a plurality of ultrasound sensor elements and an audio band array comprising audio band elements, the method comprising acts of:

transmitting an ultrasound test signal by an ultrasound transmitter;

estimating by an estimator a presence characteristic of a user in response to a comparison between a characteristic of the ultrasound test signal and a characteristic of ultrasound signals received from the ultrasound sensor array, the ultrasound signals being reflected signals of the ultrasound test signal;

generating a directional response of the audio band array by applying weights to individual audio band signals of the audio band elements by an audio array circuit; and determining the weights in response to the presence characteristic by a weight circuit.

* * * * *